Feb. 10, 1925.

A. S. HOWELL

CLUTCH MECHANISM

Filed Aug. 25, 1922

Inventor:
Albert S. Howell
By Miehle & Miehle,
Attys.

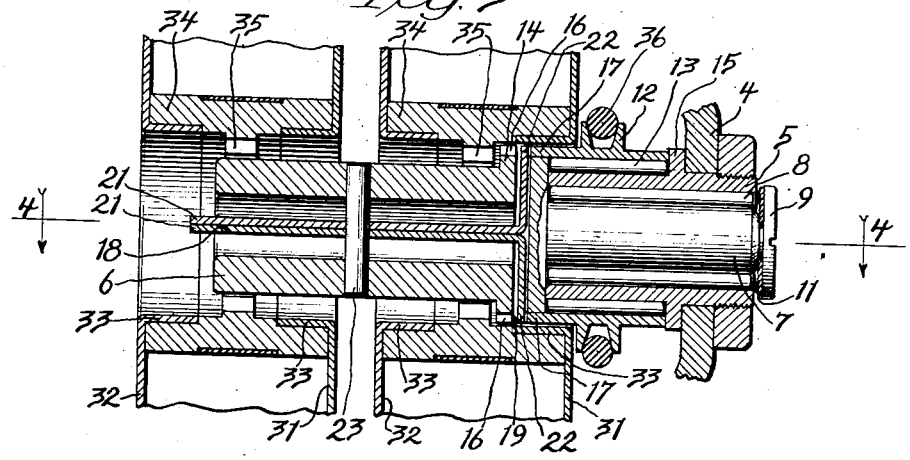
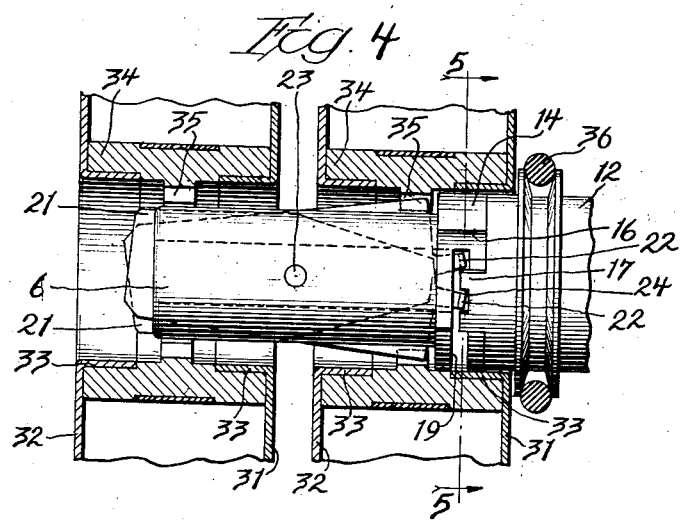
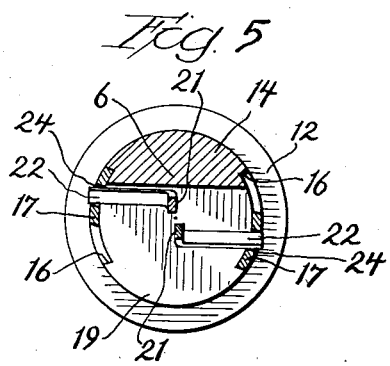 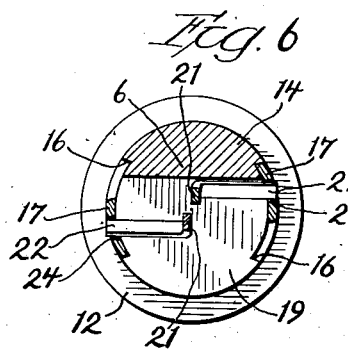
Inventor:
Albert S. Howell
By Miehle & Miehle
Attys.

Patented Feb. 10, 1925.

1,525,990

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

CLUTCH MECHANISM.

Application filed August 25, 1922. Serial No. 584,300.

*To all whom it may concern:*

Be it known that I, ALBERT S. HOWELL, a citizen of the United States, residing at Chicago, in the county of Cook and State of Illinois, have invented a certain new and useful Improvement in Clutch Mechanism, of which the following is a full, clear, concise, and exact description, reference being had to the accompanying drawings, forming a part of this specification.

My invention relates particularly to clutch mechanism for operating the film magazine spools of motion picture machines although not limited to this use alone.

The features of my invention relate to the provision of a simple, compact and efficient clutch mechanism particularly adapted to serve as the take up drive for the film spools of motion picture machines and particularly adapted for serving as the take up drive for operating axially alined film spools to drive one film spool in one direction with operation of the motion picture mechanism in one direction and to automatically release this film spool and drive the other film spool in the opposite direction when the direction of operation of the motion picture mechanism is reversed.

With these features in view my invention consists in certain features of novelty in the construction, combination, and arrangement of parts by which the said features and certain other features hereinafter appearing are effected, all as fully described with reference to the accompanying drawings and more particularly pointed out in the claims.

In the said drawings—

Figure 3 is an enlarged partial section taken on the same line and showing certain parts in different positions.

Figure 4 is a partial section taken on the line 4—4 of Fig. 3 and showing certain of the central parts in elevation.

Figures 5 and 6 are sections taken on the line 5—5 of Fig. 4 and showing certain parts in different positions.

Like characters of reference indicate like parts in the various views.

Figure 1:
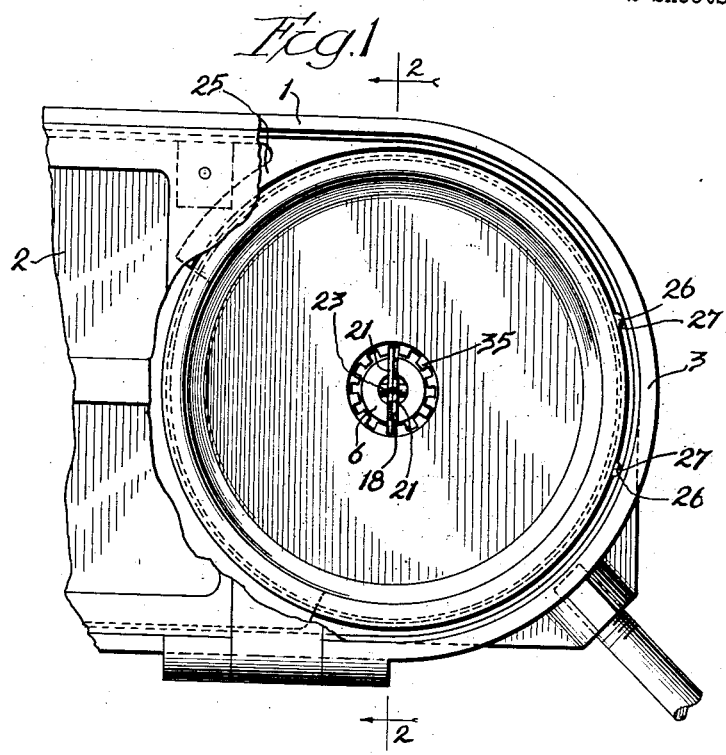
Figure 1 is a partial side elevation of a motion picture camera embodying my invention with the rear end of the door of the casing thereof broken away.

In the said drawings 1 designates a frame forming an enclosure having one side open. The open side of the frame is closed by a door 2 releasably secured in closed position in a usual manner. The rear end of the frame is semicircularly formed, as designated at 3, on a transverse horizontal axis, and the side wall of the frame has an outwardly displaced portion 4 disposed on said axis. A concentrically bored cylindrical bearing member 5 is secured in a bore of the displaced portion 4 in a usual manner, and is disposed coaxially with the semicircular rear end 3 of the frame, and projects inwardly from the displaced portion 4. A carrier shaft 6 has one end thereof reduced, as designated at 7, and this end is disposed within the bore of the member 5 and is rotatably mounted therein by means of bearing rollers 8. End thrust of the shaft is provided for by the shoulder formed by the reduced end of the shaft bearing against the inner end of the bearing member 5 and a headed screw 9 screw-threaded into the reduced end of the shaft and maintaining a bent spring washer 11 under tension between its head and the outer end of the bearing member whereby frictional means is provided for retarding rotation of the shaft for purposes hereinafter described. A concentrically bored driving pulley 12 surrounds the bearing member 5 and is rotatably mounted thereon by means of bearing rollers 13. End thrust of the pulley inwardly is provided for by a circumferential flange 14 on the shaft 6 immediately adjacent the inner end of the bearing member 5 and extending outwardly of the outer cylindrical surface thereof and against which the adjacent end of the pulley bears, and end thrust of the pulley outwardly is provided for by a flange 15 on the bearing member against which the outer end of the pulley bears. The flange 14 is provided with diametrically opposite segment slots 16, and the adjacent end of the pulley is provided with diametrically opposite lugs 17 which are engaged in the slots. These lugs are relatively narrow and have angular play in the slots whereby a lost motion driving connection is provided between the pulley and shaft.

The shaft 6 extends from the flange 14 toward the open side of the frame and this extending portion of the shaft is concentrically bored to reduce its weight. This extending portion of the shaft is provided with an axially extending diametrical slot 18 extending from a point intermediate the flange 14 outwardly to the end of the shaft. A transverse slot 19, normal to the plane of the slot 18, is formed in the shaft intermediate the flange 14 and communicates with the slot 18. A pair of superposed clutch plates 21 are movably engaged in the slot 18, and have end portions 22 extending outwardly from the axis of the shaft in opposite directions from the plane of the slot 18 through the slot 19. The clutch plates are pivotally secured at their intermediate portions to the carrier shaft 6 on a common axis normal to the plane of the slot 18 and normal to the axis of the shaft by means of a pivot stud 23 secured in the shaft and passing through holes in the plates. Thrust of the plates along the stud 23 is provided for by the outer faces of the plates bearing against the opposed surfaces of the slot 18, and this provides adequate support for the plates with respect to stresses imposed on the plates angularly of the axis of the shaft in the operation of the mechanism as hereinafter described. The lugs 17 of the driving pulley 12 extend into the plane of the slot 19 and have radial slots 24 formed therein, and the outer ends of the end portions 22 are engaged in the slots 24.

Figure 2:
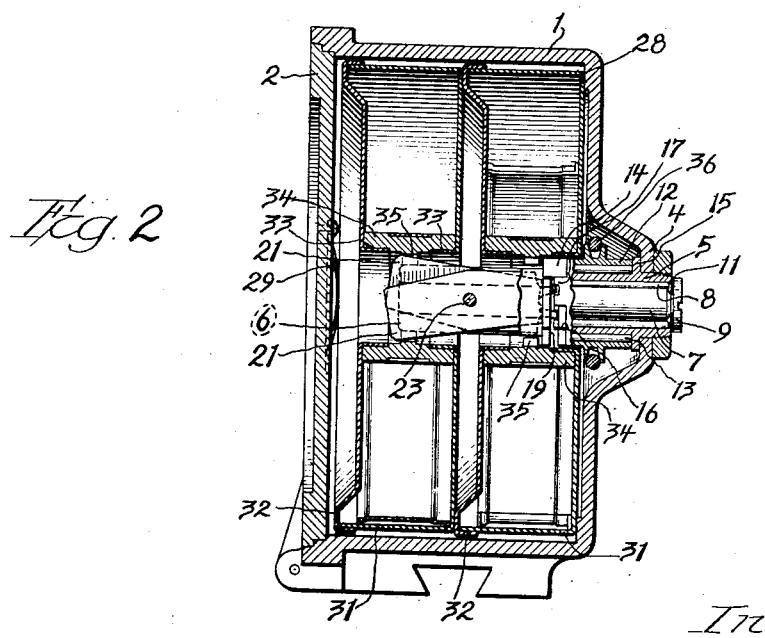
Figure 2 is a section taken on the line 2—2 of Fig. 1.

By means of the lost motion connection between the driving pulley 12 and the shaft 6 the pulley has limited angular movement with respect to the shaft, and the connections between the pulley and the clutch plates 21, formed by the engagement of the outer ends of the end portions 22 of the plates with the slots 24 of the lugs 17, effect opposite pivotal movements of the clutch plates with respect to each other with angular movement of the pulley with respect to the shaft, each plate being moved oppositely with respective opposite angular movements of the pulley with respect to the shaft. Figures 1, 2, and 6 show the pivotal positions of the clutch plates when the pulley 12 is at one end of its angular movement with respect to the shaft 6, and Figures 4 and 5 shows the opposite pivotal positions of the clutch plates when the pulley is at the opposite end of said angular movement.

Two identical circular film magazines are mounted within the rear end of the frame 1 in alined relation and coaxial with the shaft 6. These magazines are maintained in coaxial relation with the shaft by the internal semicircular surface of the wall portion 3 and a rib 25 forming an extension of this surface. The magazines are held against angular movement by projections 26 on their circumferential sides engaging grooves 27 formed on the internal surface of the semicircular wall portion 3, and are maintained in superposed relation against a seat 28 on the side wall of the frame when the door 2 is closed by springs 29 on the door. See Figs. 1 and 2. The body of each magazine comprises a circular sheet metal cup member 31 and a circular flanged sheet metal cover 32 having its flange detachably engaged with the lip of the cup member. The parallel walls of the cover and cup member of each magazine have the metal at their centers displaced to form central openings, into which the shaft 6 extends and in which the clutch plates 21 are disposed and the metal so displaced is formed into coaxial cylindrical flanges 33 extending inwardly toward each other with their adjacent ends spaced. These flanges are disposed coaxially with the shaft 6, and a concentrically bored film magazine spool 34 is disposed between the parallel walls of each magazine and surrounds respective flanges 33 and is rotatably mounted thereon. These spools have intermediately disposed, internal, and toothed flanges 35 formed in the bores thereof, which flanges extend through the space between the flanges 33 of respective magazines.

The structure of the film magazines is fully described and claimed in my copending application, Serial No. 578,444, filed July 29, 1922 and requires no further description for the present purposes.

The spools 34 are alined and disposed coaxial with the shafts 6 in surrounding relation therewith and with the clutch plates 21, and the toothed flanges 35 are disposed on opposite sides of the pivotal axis of the clutch plates. As hereinbefore described angular movement of the pulley 12 with respect to the shaft 6 effects opposite pivotal movement of the clutch plates with respect to each other, each plate being moved oppositely with respective angular movements of the pulley with respect to the shaft. The clutch plates are adapted in their opposite pivotal movements with respect to each other to engage selectively the toothed flanges 35 of the film spools 34, and as controlled by the pulley 12 in its angular movement with respect to the shaft 6 alternately drive the spools with rotation of the shaft 6 in respective directions. The tensioned spring washer 11, as hereinbefore described, retards rotation of the shaft 6 and aids in the movement of the clutch plates. Where as is shown two oppositely moving clutch plates are used the driving of the spools thereby has no tendency to cramp the parts as the spools are engaged on opposite sides of the axis of rotation.

The pulley 12 is driven from the film feeding mechanism of the machine by a belt 36 engaging a groove of the pulley and extending forwardly.

While I have herein shown and particularly described the preferred embodiment of my invention I do not with to be limited to the precise details of construction shown as changes may readily be made without departing from the spirit of my invention, but having thus described my invention, I claim as new and desire to secure by Letters Patent the following:—

1. A device of the character described including two axially alined toothed revoluble driven members, a revoluble carrier member disposed coaxially therewith, a clutch member pivotally secured on said carrier member on an axis transverse to the axis of rotation for selectively engaging the toothed driven members for driving the same, a revoluble driving member disposed coaxially with the carrier member and adapted for angular movement on the axis of rotation with respect thereto, and a connection between said driving and clutch members adapted to effect opposite pivotal movement of the clutch member with respective opposite angular movements of the driving member with respect to the carrier member whereby to drive alternately the driven members with rotation of the carrier member in respective directions.

2. A device of the character described including two axially alined toothed revoluble driven members, a revoluble carrier member disposed coaxially therewith, a pair of clutch members pivotally secured on said carrier member on a common axis transverse to the axis of the carrier member for movement in opposite directions with respect to each other to engage selectively the toothed driven members to drive the same, a driving member disposed coaxially with the carrier member, a lost motion driving connection between the driving and carrier members, connections between the driving and clutch members adapted to effect alternate engagement of the clutch members with the toothed driven members with respective opposite angular movements of the driving member with respect to the carrier member whereby to drive alternately the driven members with rotation of the carrier member in respective directions, and frictional means for retarding rotation of the carrier member.

3. A device of the character described including a revoluble carrier member, a clutch member pivotally secured on the carrier member on an axis normal to the axis of rotation, two axially alined and bored and internally toothed revoluble driven members disposed coaxially with the carrier member in surrounding relation with the carrier and clutch members and disposed to have their toothed portions selectively engaged by the clutch member in its pivotal movement to be driven thereby, a revoluble driving member disposed coaxially with the carrier member, a lost motion driving connection between the driving and carrier members, and a connection between the driving and clutch members adapted to effect opposite pivotal movements of the clutch member with respective opposite angular movements of the driving member with respect to the carrier member whereby to drive alternately the driven members with rotation of the carrier member in respective directions.

4. A device of the character described including a revoluble carrier member, a pair of clutch members pivotally secured on the carrier member on a common axis transverse to the axis of rotation for opposite pivotal movement with respect to each other, two axially alined and bored and internally toothed revoluble driven members disposed coaxially with the carrier member and in surrounding relation with the carrier and clutch members and disposed with their toothed portions on opposite sides of the pivotal axis of the clutch members, said clutch members being adapted with opposite pivotal movements thereof with respect to each other to engage selectively the toothed portions of the driven members, and means for controlling automatically the pivotal movement of said clutch members and adapted to effect alternate driving of the driven members with rotation of the carrier member in respective directions.

5. A device of the character described including a revoluble carrier shaft provided with an axially extending slot, a clutch member engaged in said slot and extending longitudinally thereof and having its intermediate portion pivotally secured to the carrier member on an axis normal to the plane of the slot, two axially alined and bored and internally toothed revoluble driven members disposed coaxially with the carrier member and in surrounding relation with the carrier and clutch members and with the toothed portions thereof disposed on opposite sides of the pivotal axis of the clutch member to be selectively engaged by the clutch member in its pivotal movement to be driven thereby, and means cooperating with the carrier and clutch members to alternately drive the driven members with rotation of the carrier member in respective directions including a revoluble driving member disposed coaxially with the carrier member and adapted for angular movement with respect thereto and a connection between the driving and clutch members adapted to effect opposite pivotal movements of the clutch member with respective opposite angular movements of the driving member with respect to the carrier member.

6. A device of the character described including a revoluble carrier shaft provided with an axially extending diametrical slot and a transverse opening extending normal to the plane of the slot and communicating therewith, a pair of superposed clutch plates movably engaged in said slot and having end portions thereof extending outwardly from the axis of the shaft in opposite directions from the plane of the slot through said opening, said clutch plates having their intermediate portions pivotally secured to the carrier shaft on a common axis normal to the plane of the slot, two axially alined and bored and internally toothed revoluble members disposed coaxially with the carrier shaft and surrounding it and the clutch members and disposed with the toothed portions thereof disposed on opposite sides of the pivotal axis of the clutch plates, said clutch plates being adapted in opposite pivotal movements thereof with respect to each other to selectively engage the toothed portions of the driven members, a driving member disposed coaxially with the carrier shaft, a lost motion driving connection between the driving and carrier members, and connections between the driving member and said end portions of the clutch plates adapted to effect alternate engagement of the clutch plates with the toothed driven members with respective opposite angular movements of the driving member with respect to the carrier shaft whereby to drive alternately the driven members with rotation of the carrier shaft in respective directions.

7. A device of the character described including a concentrically bored cylindrical bearing member, a shaft mounted for rotation within the bore of the bearing member and extending outwardly from one end thereof, a clutch member pivotally secured on the extending portion of the shaft on an axis transverse to the axis of rotation, two axially alined and bored and internally toothed revoluble driven members disposed coaxially with the shaft and in surrounding relation with the extending portion thereof and the clutch member and disposed to have their toothed portions selectively engaged by the clutch member with respective opposite pivotal movements of the clutch member, and means cooperating with the shaft and clutch member to alternately drive the driven members with rotation of the shaft in respective directions including a bored driving member surrounding the bearing member and rotatably mounted thereon and adapted for angular movement with respect to the shaft and a connection between the driving member and the clutch member adapted to effect opposite pivotal movements of the clutch member with respective opposite angular movements of the driving member with respect to the shaft.

8. A device of the character described including a concentrically bored cylindrical bearing member, a shaft mounted for rotation within the bore of said bearing member and extending outwardly from one end thereof and having this extending portion enlarged immediately adjacent the bearing member and having this enlarged portion provided with diametrically opposite segment slots, a concentrically bored driving pulley surrounding the bearing member and rotatably mounted thereon and provided with diametrically opposite lugs at one end engaging said slots to provide a lost motion driving connection with the shaft, a pair of clutch members pivotally secured on the extending portion of the shaft on a common axis disposed outwardly beyond said lugs and normal to the shaft axis and provided with extensions extending outwardly of the shaft axis in opposite directions and engaged with said lugs for effecting opposite pivotal movements of said clutch members with respect to each other with angular movement of the driving pulley with respect to the shaft, and two axially alined and bored and internally toothed revoluble driven members disposed in surrounding relation with the extending portion of the shaft and said clutch members, said clutch members being adapted in opposite pivotal movements thereof with respect to each other to engage selectively the toothed portions of said driven members.

In witness whereof I hereunto affix my signature this 23rd day of August, A. D. 1922.

ALBERT S. HOWELL.